Sept. 25, 1962
J. H. McGAUGHEY
3,055,549
SERVICE STATION INVENTORY CONTROL
Filed Aug. 11, 1958
4 Sheets-Sheet 1
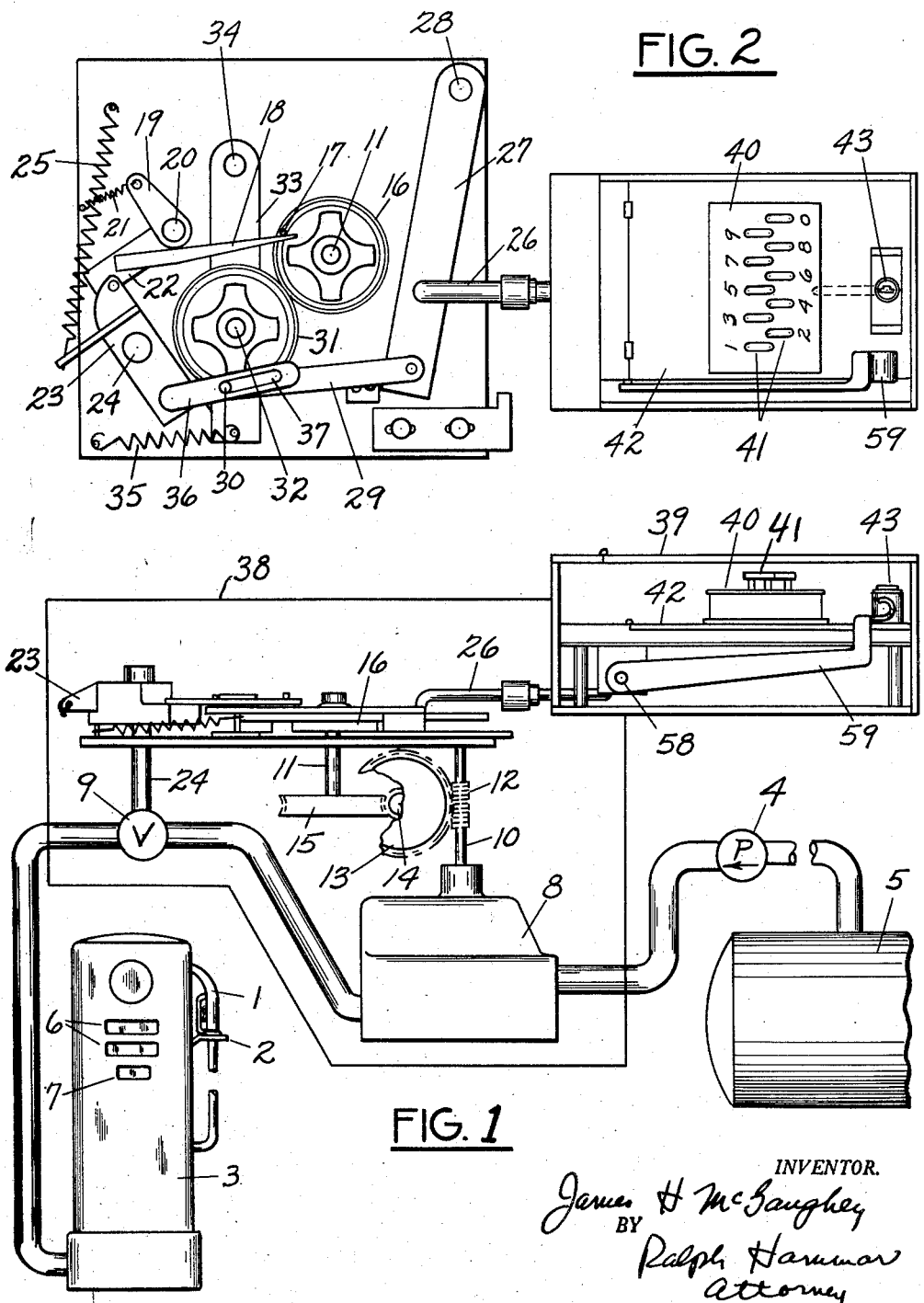
INVENTOR.
James H. McGaughey
BY
Ralph Hammar
Attorney

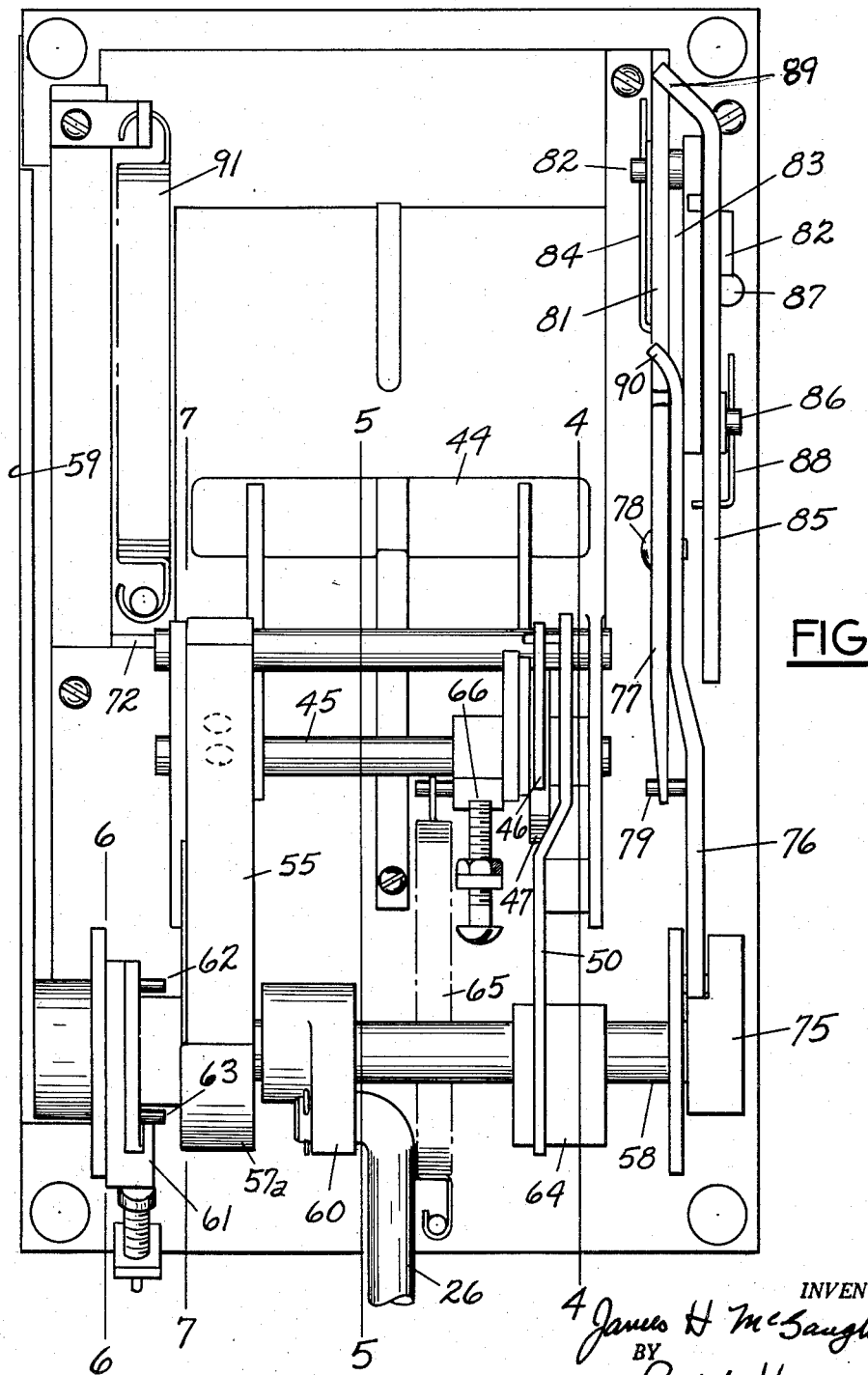

Sept. 25, 1962 J. H. McGAUGHEY 3,055,549
SERVICE STATION INVENTORY CONTROL
Filed Aug. 11, 1958 4 Sheets-Sheet 3

INVENTOR.
James H. McGaughey
BY Ralph Hammar
Attorney

Sept. 25, 1962     J. H. McGAUGHEY     3,055,549
SERVICE STATION INVENTORY CONTROL
Filed Aug. 11, 1958     4 Sheets-Sheet 4

INVENTOR.
James H. McGaughey
BY Ralph Hammar
Attorney

či
3,055,549
SERVICE STATION INVENTORY CONTROL
James H. McGaughey, Erie, Pa., assignor, by mesne assignments, to A. O. Smith Corporation, Milwaukee, Wis., a corporation of New York
Filed Aug. 11, 1958, Ser. No. 754,364
17 Claims. (Cl. 222—2)

This invention is intended to enable an oil company to control an inventory of its fuel in storage tanks on the premises of service stations. Delivery is made in bulk to the service station storage tanks but cannot be used until released to the service station in agreed quantities at the direction of the oil company. Until released, the fuel remains in full control of the oil company.

The service station draws its fuel from the storage tank through a meter under the sole control of the oil company which actuates a shut-off valve after passing the agreed quantity or lot of fuel. In order to draw further fuel from the storage tank, the service station must purchase an additional lot of fuel. After making the purchase, instead of receiving a delivery of fuel, the service station receives from the oil company a code combination to be set into a code device which permits resetting of the shut-off valve so that the additional lot of fuel can be drawn from the storage tank. The amount of fuel which can be withdrawn at each resetting of the shut-off valve is selected by the oil company so that the unit of sale will fit the requirements of the service station. The code combination to be used for each successive release of fuel is known only to the oil company so that the service station cannot receive fuel until being given the code combination, which will vary with each lot of fuel released.

This system gives the service station the advantage of an immediately available supply of fuel from an on the premises storage and gives the oil company the advantage of bulk delivery of larger quantities than would be normally purchased. If there should be inaccuracies in the meter controlling the shut-off valve, periodic readings of the totalizers on the service station pumps may be taken and appropriate adjustments made in the billing. For the success of the system, it is not necessary that the meter controlling the shut-off valve be perfectly accurate.

If the service station sets up the wrong code combination, the shut-off valve cannot be reset. This prevents tampering.

Figure 4:
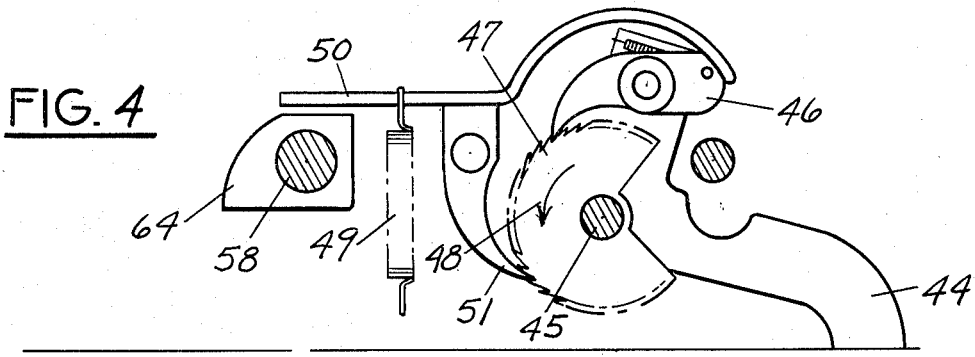
Figure 5:
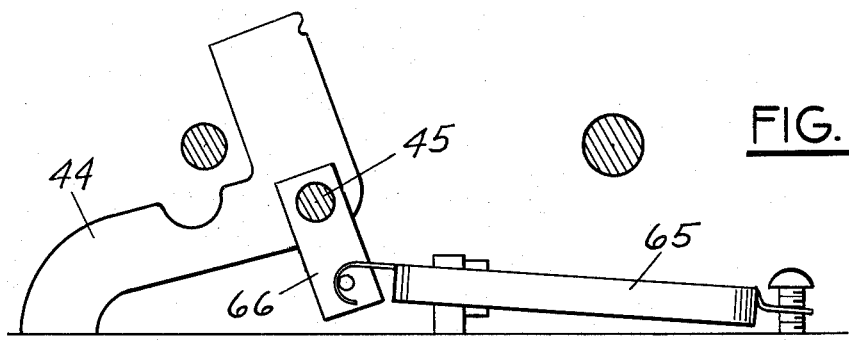
Figure 6:
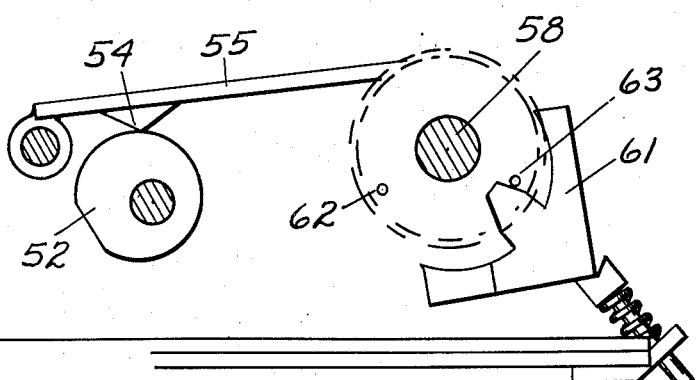
Figure 7:
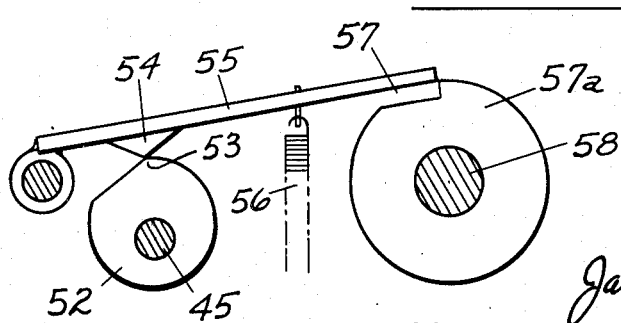
Figure 8:
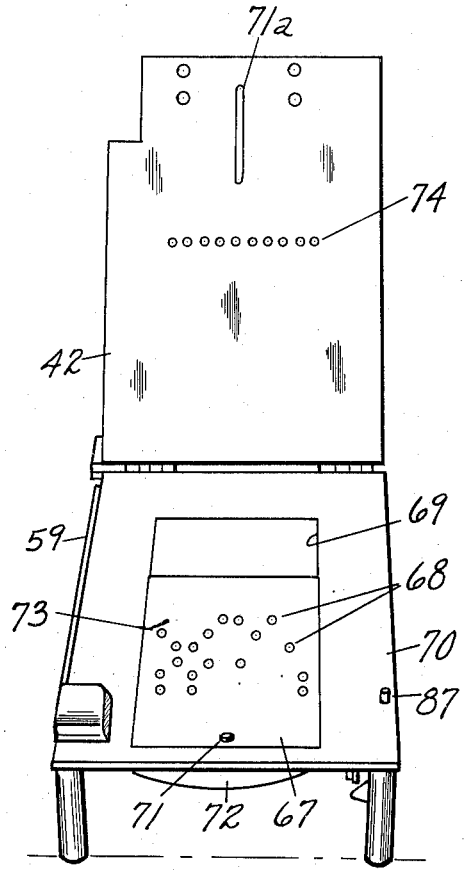
Figure 10:
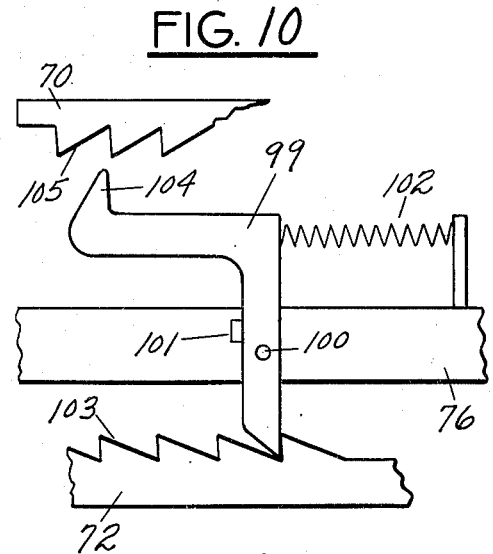
Figure 11:
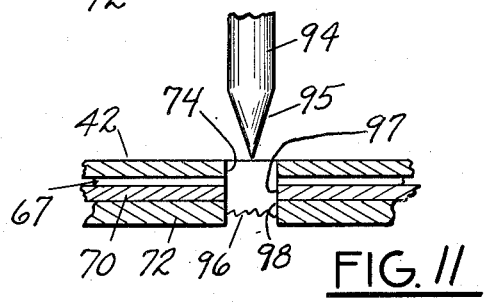
Figure 9:
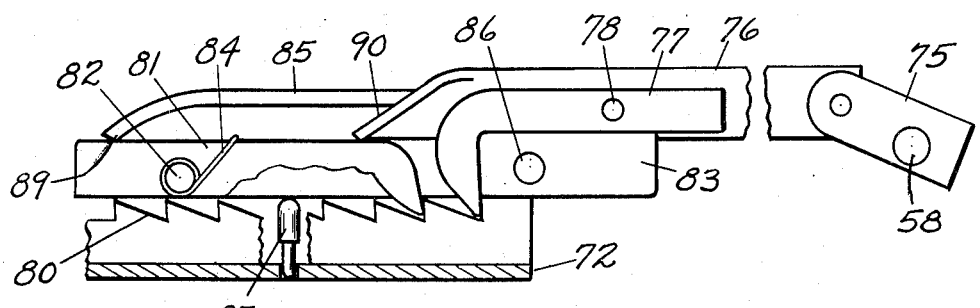

In the drawings, FIG. 1 is a diagrammatic view of a service station equipped with the inventory control, FIG. 2 is a top plan view of the code device accessible to the service station and of the control for the fuel shut-off valve, FIG. 3 is a bottom view of the mechanism for controlling the resetting of the fuel shut-off valve, FIGS. 4, 5, 6 and 7 are sections taken on the correspondingly numbered lines in FIG. 3, FIG. 8 is a perspective showing the punch card used to control the resetting of the fuel shutoff, FIG. 9 is a side view of the ratchet mechanism for advancing the carriage, FIG. 10 is a sectional view showing the blocking of the carriage by incorrect punching of the code device, and FIG. 11 is a diagrammatic view of a mechanism for preventing resetting when added resistance is encountered due to incorrect punching of the code device as shown in FIG. 10.

The delivery of fuel to customers of the service station is in the conventional manner. The nozzle 1 is removed from its supporting hook 2 on the dispensing unit 3 and delivery is made under pressure maintained by a pump 4 connected to an underground storage tank 5 and at a rate controlled by the service station attendant. The amount of fuel and the price appear on the usual computer register 6. The dispensing unit also has equipped an indicator 7 for the unit price of the fuel. The parts so far described are or may be of common construction and may include additional features than those described.

All of the fuel flowing to the dispenser unit 3 passes through a flow meter 8 and a valve 9. The flow meter shaft 10 which rotates in proportion to the gallons flowing through the meter drives a shaft 11 through a gear train 12, 13, 14 and 15. The shaft 11 has a friction drive to a ratchet 16 which is rotated in a counterclockwise direction as viewed in FIG. 2 by the flow meter shaft 10. The ratchet 16 carries a pin 17 which at the end of a preselected total of flow through the flow meter strikes an arm 18 fixed on a latch member 19 pivoted at 20 and turns the latch member in a clockwise direction against the force of spring 21 until latch surface 22 on the member 19 is clear of a latch member 23 fixed to a shaft 24 controlling the valve 9. When the latch member 23 is unlocked, the valve shaft 24 is rotated by the spring 25 in a clockwise direction as viewed in FIG. 2 to shut the valve 9. When the valve 9 is shut, no further deliveries of fuel may be made through the dispensing unit until the valve is reset to the open position.

The resetting of the valve 9 to the open position is effected by a rod 26 connected to a lever 27 pivoted at one end on a fixed pivot 28 and connected at the other end to a link 29 connected to a pin 30 on a ratchet member 31. The ratchet member 31 is rotatably carried on a pivot 32 on a lever 33. The lever 33 is mounted at one end on a fixed pivot 34 and is connected at the other end to a spring 35 which biases it in a clockwise direction about the fixed pivot 34 and normally holds the ratchet 31 clear of the ratchet 16. Upon pulling the rod 26 to the right as viewed in FIG. 2, the lever 33 is pivoted to move the ratchet 31 into engagement with the ratchet 16 and at the same time the ratchet 31 is rotated and drives the ratchet 16 in a clockwise direction thereby moving the pin 17 back away from the arm 18 on the latch member 19 a distance determined by the movement of the rod 26. This resets the position of the ratchet 16 with respect to the shaft 11 so that a definite amount of rotation of the shaft by the flow meter 8 is necessary before the pin 17 again contacts the arm 18 and moves the latch member 19 to a position releasing the latch 23. Accordingly a definite number of gallons of fuel must flow through the flow meter 8 before the latch 23 is released to again shut the valve 9. By reason of a link 36 connected to the latch member 23 and to the pin 30 by means of a slot 37, the same movement of the link 29 which resets the ratchet 16 also resets the valve 9 to the open position. The slot 37 also permits the latch member 23 controlling the valve 9 to move to the valve closing position without exerting any force on the link 29.

By the structure so far described, it is apparent that the flow of a preselected number of gallons of fuel through the flow meter 8 causes the tripping of the latch 23 controlling the valve 9 thereby shutting the valve and preventing the further supply of fuel to the dispensing pump and it is also apparent that by means of the mechanism associated with the pull rod 26, the valve 9 can be reset to the open position and the ratchet 16 can be reset to a position permitting the flow of a like number of gallons of fuel through the flow meter 8 before the valve 9 is again tripped. The number of gallons in each lot of fuel permitted to flow through the meter 8 each time the valve is reset will depend upon the wishes of the service station. The number of gallons could, for example, be 500 gallons or some larger multiple such as 1,000 or 1,500 gallons. The number of gallons would, however, be substantially less than the capacity of the storage tank 5 which might, for example, be a 10,000 gallon tank.

In order that the oil company may have the convenience of delivering fuel to the storage tank in bulk lots of up to 10,000 gallons while the service station may have the convenience of buying fuel in smaller lots from on the premises storage, it is necessary that the oil company retain control over the mechanism for releasing these smaller lots of fuel. It is also necessary that the service station have access to the mechanism for releasing the small lots at the direction of the oil company. The service station obviously cannot have access to the flow meter 8 and valve 9 and the parts associated therewith which are mounted within an enclosing housing diagrammatically indicated at 38 to which only the oil company has access. By lifting a cover 39, the service station has access to a keyboard 40 containing a code device such as punch keys 41 which may be punched or set in any code combination. By assigning to each lot of fuel to be released a code combination known only to the oil company, it is possible for the oil company to retain control of the fuel and to release each lot by informing the service station of the code combination to be used for that particular lot. Since the code device is carried on a hinge member 42, locked by a lock 43 to which only the oil company has the key, the service station cannot obtain the release of any lot of fuel until informed by the oil company of the code for that lot.

Each time one of the keys 41 is depressed, it depresses (moves upward as viewed in FIG. 4) a treadle 44 pivoted on a shaft 45 and carrying a pawl 46 which turns a ratchet 47 fixed to shaft 45 in the direction of arrow 48. The extent of depression of the treadle 44 depends upon the particular key 41 which is depressed. When the key is released, the treadle returns to the initial position under the influence of a spring 49 connected to a trip arm 50 carrying a pawl 51 which prevents reverse rotation of the ratchet 47 so long as the trip arm 50 is held in the position illustrated in FIG. 4. When the proper code has been punched, a cam 52 also fixed to the shaft 45 will be rotated to the position illustrated in FIG. 7 in which point 53 on the cam 52 is directly below the peak of projection 54 on a lock arm 55 urged by a spring 56 toward a recess 57 in a lock member 57a fixed to a shaft 58. Only when the peak 53 on the cam 52 engages the peak of projection 54 is the lock arm 55 lifted out of the recess 57 to permit turning of the shaft 58. In all other positions of the cam 52, the lock arm 55 is held by spring 56 in the locking recess 57 and turning of the shaft 58 is prevented. Accordingly only by punching the correct code so as to obtain the precise amount of rotation of the shaft 45 is it possible to bring the cam 52 to the position unlocking shaft 58. If an incorrect code combination is punched, the cam will be to one side or the other of the position illustrated in FIG. 7 and the shaft 58 will remain locked.

So long as the shaft 58 is locked, it is impossible for the service station to reset the shut-off valve 9. As soon as the shaft 58 is unlocked, the resetting is effected by lifting reset lever 59 fixed to the shaft 58 and turning the shaft in a counterclockwise direction as viewed in FIG. 1 thereby turning a crank 60 fixed to the shaft 58 in the direction to pull the rod 26 upward as viewed in FIG. 3 (to the right as viewed in FIGS. 1 and 2). This resets the valve 9 to the open position (if it was closed) and also resets the ratchet 16 controlling the quantity of fuel to be delivered. During the resetting movement of the lever 59 reverse movement of the lever is prevented by a reversible ratchet 61. The ratchet restricts the movement of the resetting lever 59 to a full stroke upward followed by a full return stroke. In the position shown in FIG. 6 the ratchet permits upward movement of the reset lever 59 but prevents downward or backward movement of the lever. When the resetting lever 59 reaches the extreme upper end of the resetting stroke, a pin 62 reverses the position of the ratchet 61 thereby permitting the return or downward movement of the lever 59 to the substantially horizontal position shown in FIG. 2. During the return movement of the lever 59, the ratchet 61 prevents reverse or upward movement of the lever and this condition continues until the lever 59 reaches its horizontal position where pin 63 engages the ratchet 61 and moves it to the position shown in FIG. 6. At the start of the upward or resetting movement of the lever 59, a cam 64 fixed on the shaft 58 lifts the trip lever 50 so that the pawls 46 and 51 are clear of the ratchet 47. The shaft 45 to which the ratchet 47 is fixed is reset to its starting position by a spring 65 connected to an arm 66 fixed on the shaft 45. At the end of the resetting operation of the lever 59, the locking lever 55 drops into locking recess 57 and the resetting lever 59 cannot be again actuated until the new code number has been set in the code device 41. Each code combination permits only a single resetting actuation of the reset lever 55.

Each time the resetting lever 59 is actuated, the ratchet 16 driven by the flow meter 8 is set back a distance corresponding to the lot of fuel to be released. It is not necessary that the service station wait until its supply of fuel is completely exhausted for purchasing a new lot and receiving a new code number. The service station can purchase two or more lots at the same time and, by punching each assigned code combination and actuating the reset lever 59 in succession, can turn the ratchet 16 backward a distance corresponding to the two or more lots for which code combinations have been received.

One way of preventing tampering with the equipment and of providing a record of the code combinations to be used by the service station is through the punch cards 67 shown in FIG. 8 which are punched in duplicate with a plurality of rows 68 of code combinations with each row corresponding to a single lot of fuel to be released. The card can carry identification of the service station and of the number of gallons of fuel in the lots. In the particular card illustrated in FIG. 8 there are six rows 68 each punched in a three digit code. The card is slidably mounted in a shallow groove 69 in a frame 70 beneath the hinged cover 42 controlled by the lock 43. The initial position of the card in the groove 69 is determined by a projection 71 on a carriage 72 slidably mounted on the underside of the frame member 70 and sliding in slot 71a in the cover 42 and in a similar slot (not shown) in the frame member. The projection 71 fits accurately in a hole in the card 67 and positively locates the card. It the first position, the row 73 corresponding to the first lot of fuel to be released registers with a row of holes 74 in the hinged plate 42 through which the punch keys 41 project when the keys are depressed. If the service station should depress the wrong code combination, the keys 41 will punch additional holes thereby making a record of the error. When the correct code combination is punched, the punched keys 41 project down through the prepunched holes in the card into engagement with the treadle 44 and advance the ratchet 47 fixed to the shaft 45 and turn the cam 52 to the position unlocking the locking lever 55 which normally prevents movement of the reset lever 59.

The movement of the reset lever 59 is also used to reset the valve 9 and the ratchet 16 as described above and is also used to advance the punch card 67 to the next position. This is accomplished by a crank arm 75 fixed to the shaft 58 and connected to a link 76 which in connection with associated ratchet mechanism advances the carriage 72 a distance equal to the spacing between two adjacent rows 68 to bring the next code combination into register with the holes 74 and permit the service station to again actuate the reset lever 59 and release another lot of fuel. The ratchet mechanism associated with the link comprises a pawl 77 pivoted at 78 on link 76 and biased against ratchet teeth 80 on the carriage with the spacing between adjacent teeth 80 equal to the spacing between adjacent rows of prepunched holes 68 in the punch card 67. Upon raising the reset lever 59 the pawl 77 pulls the carriage 72 to the right as viewed in FIG. 9. Upon lowering the reset lever 59 the pawl 77 moves into engagement with the next tooth 80 in readiness for the next carriage advance operation. Reverse movement of the carriage is prevented by a pawl 81 pivoted at 82 on a bracket 83 fixed to the frame 70 and biased into engagement with teeth 80 by grasshopper spring 84. By this ratchet construction, each resetting actuation of the lever 59 advances the carriage 72 the distance between adjacent rows of holes 68 and positions the next code combination beneath the code device 41.

Before a new punch card is inserted, the carriage 72 should be reset to the initial position. This is accomplished by a trip lever 85 pivoted at 86 on the bracket 83 and biased against a button 87 by a spring 88. The button 87 extends slidably through the frame 70 and is depressed by the closing of the cover 42. When the cover 42 is opened, the button 87 is moved upward by the force of spring 88 and a tab 89 on trip lever 85 overlying the pawl 81 pivots the pawl clear of the teeth 80. A tab 90 on the link 76 transmits a lifting force to link 76, raising the link until pawl 77 pivots against stop 79 and is thereafter lifted with the link clear of the teeth 80. The carriage is then returned to the initial position by a spring 91 in readiness for insertion of a new punch card 67.

In the operation of the system, when the tank truck driver is ready to make a delivery, the dispatcher of the oil company gives him duplicate dated punch cards 67 for each service station at which a delivery is to be made prepunched with as many code combinations as there are lots of fuel to be delivered. When the driver arrives at the service station, he first places the duplicate set of punch cards in the ticket printer on his truck, sets the truck totalizer to zero and stamps the punch card before he starts to deliver fuel. The fuel delivery is then made and both punch cards are stamped with the gallons delivered as indicated by the totalizer readings. All but one of the punch cards is returned to the oil company for record purposes and the remaining card is locked in the groove 69 on the underside of the hinge plate 42 with the carriage 72 reset so that the first row 73 on the punch card is directly below the row of openings 74 through which the punch keys 41 extend. In this position, the punch card is ready for the release of the first lot of fuel. The service station cannot, however, release this first lot of fuel until it has been purchased from the oil company. At the time of purchase, the dispatcher of the oil company will give the service station the code to be used to release the lot of fuel. The dispatcher of the oil company has one of the duplicate sets of punch cards 67 and can tell from the arrangement of the holes what the code number is. This code number may be given to the service station at the time of the purchase of the lot of fuel or it may be given later over the telephone.

When the service station wishes to release the lot of fuel, the designated code is punched in the keys 41 thereby advancing the ratchet 47 fixed to the shaft 45 so as to turn the cam 52 to the position shown in FIG. 7 which unlocks the locking lever 55. Unlocking of the locking lever 55 permits the service station attendant to actuate the reset lever 59 to reset the ratchet 16 driven by the fuel meter 8. The resetting can only be done by a full upward and a full return stroke of the reset lever 59. Reverse movement of the reset lever is prevented at all points during the upward and return strokes. The same resetting movement of the lever 59 advances the carriage 72 the distance between the two adjacent rows 68 of punched holes thereby positioning the card for the next lot of fuel.

If the service station should punch the wrong code either accidentally or in an attempt to secure a lot of fuel for which release had not been authorized, holes will be punched in the card to make a record of the error. In addition, by using a punch 94 with a pointed end 95, a burr 96 will be formed which will be depressed through hole 97 in the frame 70 into hole 98 in carriage 72. All of the holes 74, 97 and 98 are in alignment when the cover is closed. The burr 96 offers resistance to sliding of the carriage which must shear the burr before it can be moved. By using the pawl arrangement of FIG. 10 this added resistance is used to lock the reset lever so it cannot be used until an oil company service man has put the equipment back in order. The arrangement of FIG. 11 which can be added to FIG. 3 in place of the pawl 77, has a pawl 99 pivoted at 100 on the link 76 and biased against a stop 101 by compression spring 102. In this position, the pawl cooperates with teeth 103 on the carriage 72. Under normal operation the pawl 99 has the same function as pawl 77. It slides over the teeth 103 when the link 76 is moved to the left and moves into engagement with the teeth when the link is moved to the right as viewed in FIG. 10. However, when an incorrect code is punched, the added resistance of one or more burrs 96 causes the pawl 99 to pivot in a clockwise direction as viewed in FIG. 10 moving tooth 104 into engagement with teeth 105 fixed to the frame 70. This positively prevents movement of the link 76 and thereby prevents resetting movement of the lever 59 because the link 76 is fixed to the shaft 58 through the link 76 and the crank 75 and the lever 59 is directly fixed to the shaft 58. Blocking movement of the link 76 accordingly prevents the turning of the shaft 58 essential to resetting. Tampering with the code device 41 is discouraged because, in addition to making a record of the tampering, it disables the mechanism and requires calling a service man to put it back in order.

What is claimed as new is:

1. A service station inventory control system for releasing to the station pre-selected quantities of fuel from storage at the station connected by a flow line to station dispensing equipment comprising, a meter in a flow line from the storage to the station dispensing equipment, trip means driven by the meter for shutting off the flow after the flow of a quantity of fuel through the meter determined by the setting of the trip means, a control having a reset device mounted within a releasably locked enclosure for selective resetting the trip means and a code device settable in a variety of code combinations, locking means for the reset device, and means actuated by setting the code device in a sequence of code combinations for unlocking the reset device at each code combination to permit a resetting actuation of the reset device, said reset device returning to a locked condition at the end of each resetting actuation, said code actuated means being sealed for limited access.

2. A service station inventory control system for releasing to the station preselected quantities of fuel from storage at the station connected by a flow line to station dispensing equipment comprising, a meter in a flow line from the storage to the station dispensing equipment, a shut-off valve in said line, trip means driven by the meter for shutting the valve after the flow of a quantity of fuel through the meter determined by the setting of the trip means, a control having a normally locked reset lever for opening the valve and resetting the trip means and having punch keys identified by characters permitting the keys to be punched in a variety of code combinations, said reset lever being unlocked by punching the keys in a sequence of code combinations, a card for making a record of unauthorized code combinations used by the station, and means actuated by the punching of the keys in each authorized code combination for unlocking the reset lever to permit a single resetting actuation of the reset lever, said reset lever returning to a locked condition at the end of each resetting actuation, the last named means and the lock for the reset lever being sealed to control access.

3. An inventory control system for releasing a fluid from storage to a dispensing device comprising, a flow line connecting the storage to the dispensing device, a meter in the flow line, trip means driven by the meter for shutting off the flow after the flow of a quantity of fuel through the meter determined by the setting of the trip means, a control having reset means for resetting the trip means and having a code device settable in a variety of code combinations, locking means for the reset means, means actuated by setting the code device in a given code combination for unlocking the reset means to permit resetting of the trip means.

4. A service station inventory control system for releasing to the station preselected quantities of fuel from storage at the station connected by a flow line to station dispensing equipment comprising, a meter in a flow line from the storage to the station dispensing equipment, trip means driven by the meter for shutting off the flow after the flow of a quantity of fuel through the meter determined by the setting of the trip means, a control having a code device settable in a variety of code combinations, reset means for resetting the trip means, means responsive to the setting of the code means in an authorized code combination for conditioning the reset means for resetting the trip means, and means responsive to the setting of the code means in a code combination different from that authorized for disabling the reset means.

5. A service station inventory control system for releasing to the station preselected quantities of fuel from storage at the station connected by a flow line to station dispensing equipment comprising, a meter in a flow line from the storage to the station dispensing equipment, trip means driven by the meter for shutting off the flow after the flow of a quantity of fuel through the meter determined by the setting of the trip means, a control having reset means for resetting the trip means and code means settable in a variety of code combinations, locking means for the reset means, means actuated by setting the code means in any of said variety of code combinations for unlocking the reset means to permit resetting of the trip means, and means for making a record of setting of the code means in combinations different from the code combination set in the code means.

6. A service station inventory control system for releasing to the station preselected quantities of fuel from storage at the station connected by a flow line to station dispensing equipment comprising, a meter in a flow line from the storage to the station dispensing equipment, a shut-off valve in said line, trip means driven by the meter for shutting the valve after the flow of a quantity of fuel through the meter determined by the setting of the trip means, a control having accessible to the service station a reset lever for opening the valve and resetting the trip means and having punch keys identified by characters permitting the keys to be punched in a variety of code combinations, said control having parts housed in a locked enclosure and comprising locking means for the reset lever, a card prepunched in a plurality of successively usable code combinations, means positioning the card in successive positions in each of which the prepunched code combination registers with the punch keys when the keys are punched in accordance with the code combination authorized by the supplier, the card in each of said positions being further perforated by punching the keys in unauthorized code combinations, the unauthorized punching of any key resulting in a burr on said card which offers resistance to sliding of the card to the succeeding position, and means actuated by the punching of the keys in each authorized code combination for unlocking the reset lever to permit a single resetting actuation of the reset lever, said reset lever moving the card to the succeeding position at the start of the resetting operation and returning to a locked condition at the end of each resetting actuation, the card positioning means and the lock for the reset lever being sealed, and means responsive to the resistance of said burrs for disabling the reset means.

7. An inventory control system for releasing a fluid from a storage area to a dispensing device, comprising a flow line connecting the storage area to the dispensing device, a meter disposed in the flow line and including a rotatable member disposed to be rotated from a first position to a second position by the flow of fluid through the meter, trip means driven by the meter for shutting off the flow of fluid through said flow line when said rotatable member has rotated to said second position, reset means operably connected to both said trip means and said rotatable member for resetting said trip means and rotating said rotatable member to said first position, code means presettable in a variety of code combinations, means to operate the code means, and means responsive to actuation of the code means in a given preset code combination for conditioning the reset means to reset said trip means and rotate said rotatable member to said first position.

8. An inventory control system for releasing a fluid from storage to a dispensing device, comprising a flow line connecting the storage to the dispensing device, a meter disposed in the flow line and including a rotatable member rotated by the flow of fluid through the meter from a first position to a second position, valve means disposed in the flow line for controlling the flow of fluid therethrough, trip means operably connected to said valve means for closing the valve, abutment means connected to the rotatable member and disposed to actuate said trip means and close said valve means when said rotatable member has rotated to said second position, reset means operably connected to both said valve means and said rotatable member for opening the valve and rotating said rotatable member to said first position, locking means for the reset means, code means settable in a plurality of code combinations, rotatable cam means operably connected to said locking means, and means actuated by setting the code means in a given code combination for rotating said cam means to a given position to thereby unlock said locking means and permit resetting of said reset means.

9. An inventory control system for releasing pre-selected quantities of a fluid from a storage container, comprising a meter disposed in the flow line from the storage container to a dispensing device, valve means disposed in the flow line, trip means driven by the meter for closing said valve means after the flow of a quantity of fluid through the meter determined by the setting of the trip means, a control having accessible to the operator a reset means for resetting the trip means and a code means including a plurality of members to be actuated in a variety of code combinations, a card having successive groups of code indicia with each group corresponding to a different code combination, a support for the card, means actuated by operating said members in an authorized code combination for unlocking the reset means, and indexing means operated by the actuation of said reset means for moving the support and the card relatively to each other to successively position a different group of code indicia in alignment to receive said members for the code combination for that group.

10. An inventory control for releasing preselected quantities of a fluid from a storage unit connected by the main line to a plurality of individually operable dispensing devices each having means to record delivery from the corresponding device, which comprises a totalizing meter connected to the main line and responsive to total flow from the storage unit to establish an output in proportion to the total flow, stop means to operatively disconnect all of said dispensing devices from said storage unit, preset means coupled to the meter and operated in accordance with said output and connected to actuate the stop means after a predetermined flow, and code-controlled means in said preset means to establish the predetermined flow causing actuation of the stop means.

11. An inventory control system for releasing to a dispensing device preselected quantities of a fluid from storage, comprising a flow line connecting the storage to the dispensing device, a meter disposed in the flow line, trip means driven by the meter for shutting off the flow of fluid through said flow line after the flow of a quantity of fluid through the meter determined by the setting of the trip means, a control having a code device sequentially presettable in one of a variety of code combinations and means to actuate the code device in accordance with the variety of code combinations, reset means for resetting the trip means, means responsive to actuation of the code device in accordance with a preset code combination for conditioning the reset means for resetting the trip means, and means responsive to said last named means to automatically establish a different one of the variety of code combinations in the code device.

12. An inventory control system for successively releasing quantities of a fluid from storage means, comprising a discharge line connected to the storage means, discharge means connected in said discharge line for preventing flow of fluid from the storage means, flow responsive means disposed in said discharge line and operably connected to said discharge means for controlling said discharge means, a control having a series of presettable code combinations and having means to successively actuate the control in accordance with each of the series of code combinations, means responsive to actuation of the control in accordance with a preset code combination for conditioning the flow responsive means to permit discharge of a quantity of fluid from storage, and means responsive to said last named means to automatically preset a different one of the code combinations in the control.

13. An inventory control system for successively releasing quantities of material for discharge from a storage means, which comprises means to prevent material withdrawal from the storage means, release means for conditioning said means to prevent material withdrawal to permit withdrawal of a selected quantity of material from the storage means, a code actuated control for operating said release means including a series of different operating code means, and means to sequentially establish the next succeeding code means in response to successive actuation of the code actuated control.

14. The construction of claim 13 including means to record an improper actuation of the code actuated control.

15. The construction of claim 13 including means to lock the code actuated control against further operation upon establishment of an improper actuation thereof.

16. The construction of claim 13 wherein said code actuated control includes a movable code carrying element containing said series of different operating code means movably mounted within a locked housing and a code actuator mounted on the housing for exterior actuation, coupling means between said code actuator and the release means including code sensing means for sensing one of the different operating code means depending upon the relative position of the code sensing means and the code carrying element, and means for positioning the code carrying element with one of the different operating code means aligned with the code sensing means.

17. The construction of claim 16 wherein said code carrying element is a plate-like member having the series of different operating code means as a series of code rows with each row including a similar number of spaced code areas selected from different permissible spaced code columns, and the code sensing means includes a series of aligned sensing elements spaced in accordance with the spaced code columns and mounted for sequential alignment with said code rows.

References Cited in the file of this patent

UNITED STATES PATENTS 2,754,950    Harris _____ July 17, 1956
2,858,048    Harks _____ Oct. 28, 1958